Figure 1:
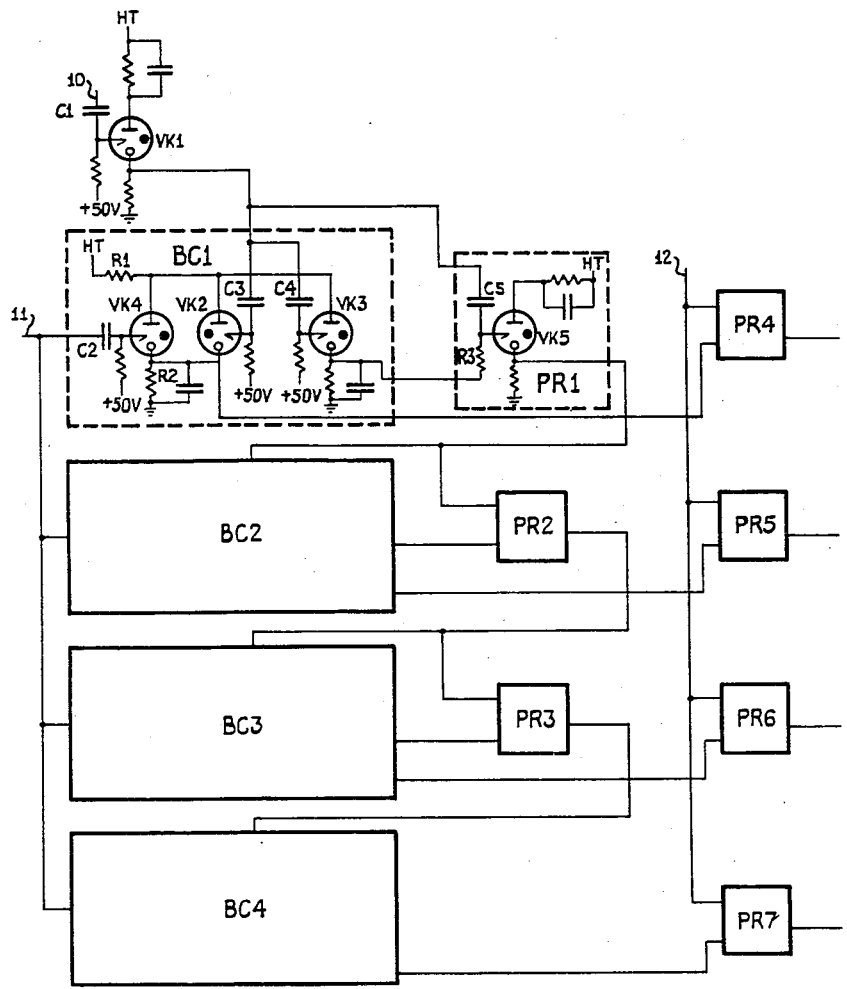
Figure 2:
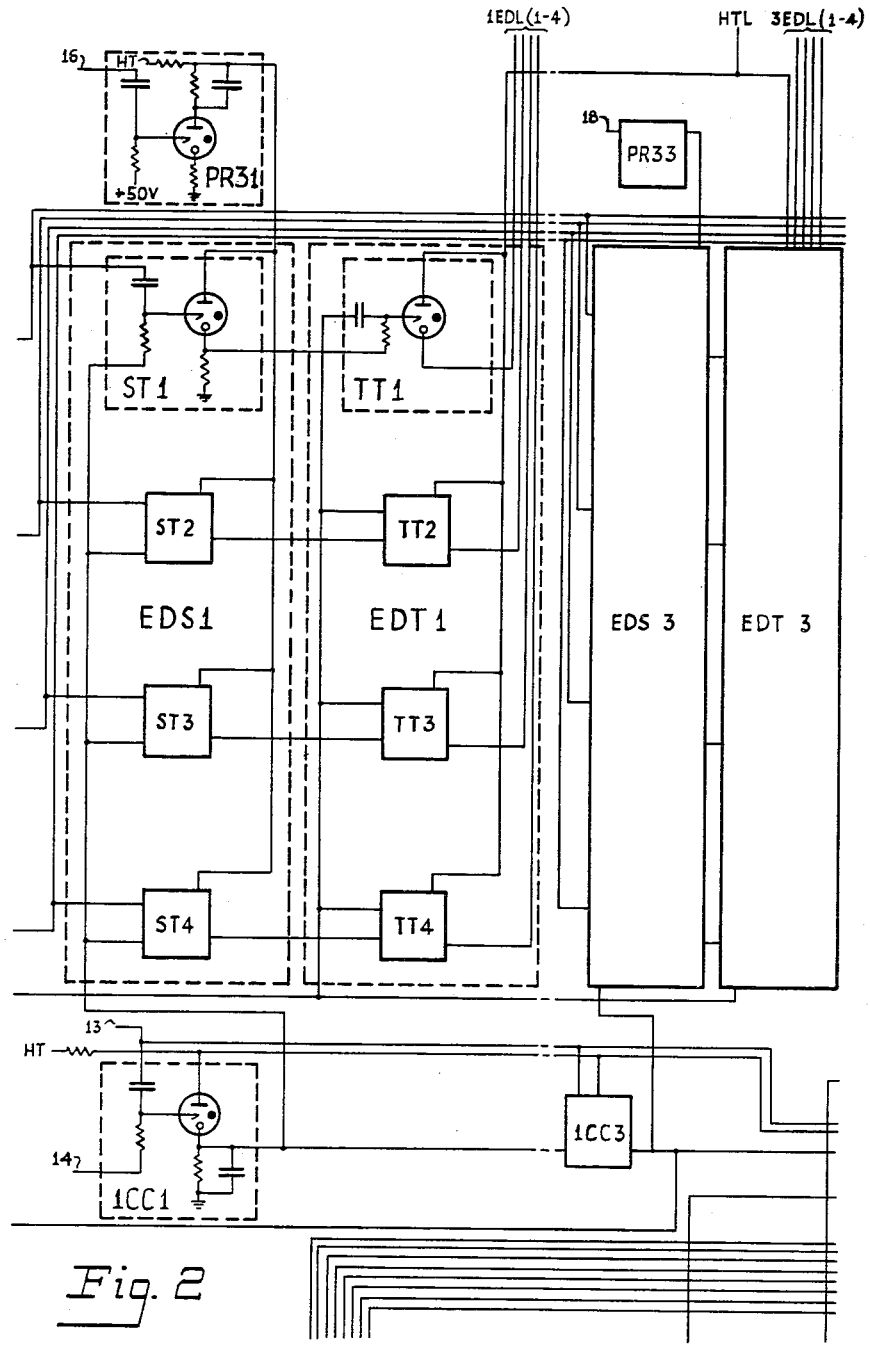
Figure 3:
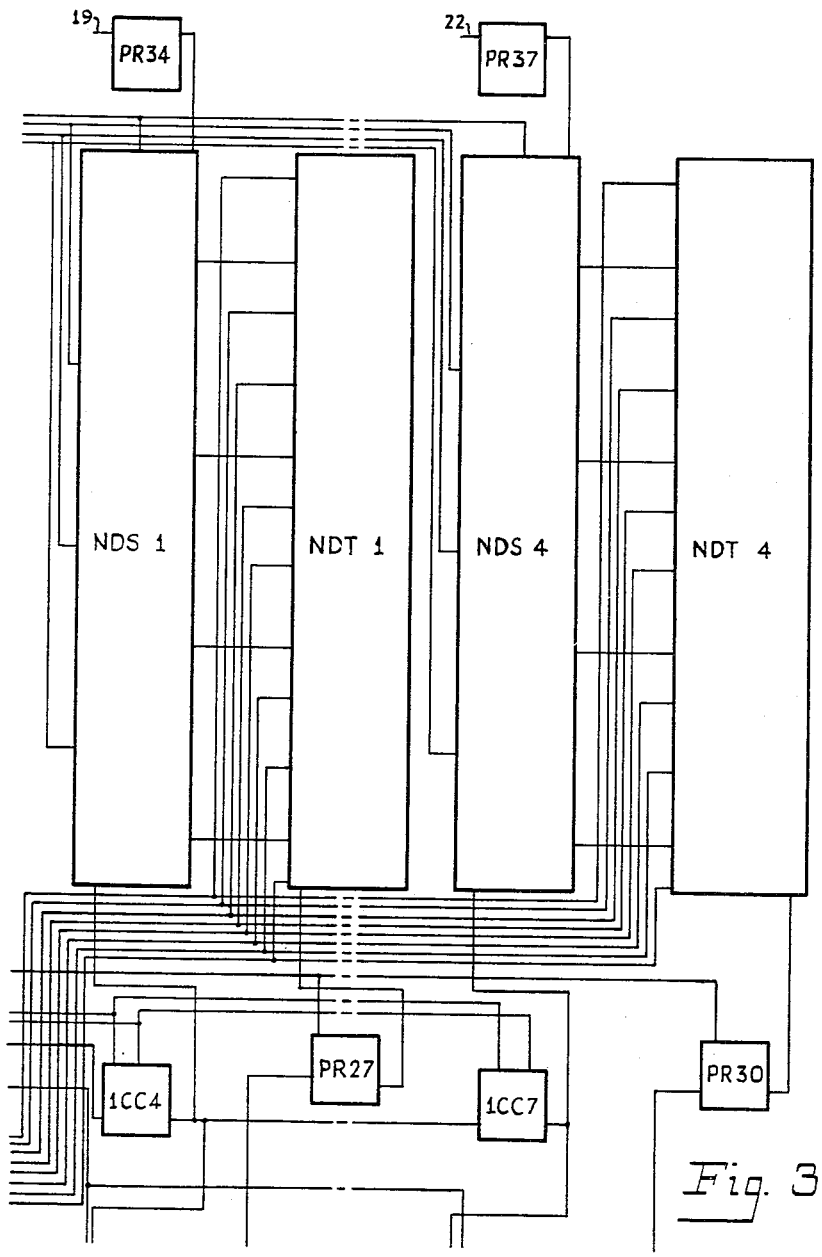
Figure 4:
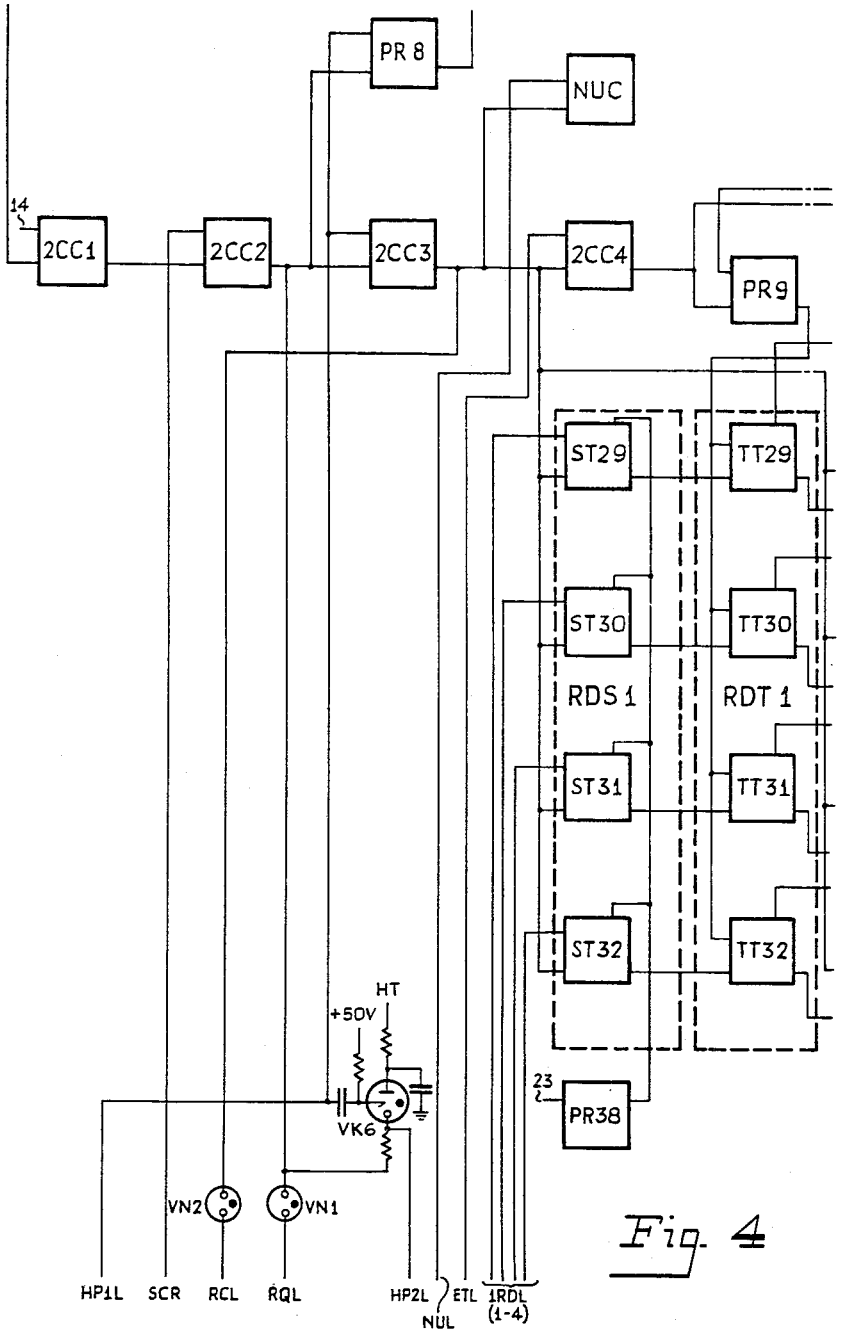
Figure 5:
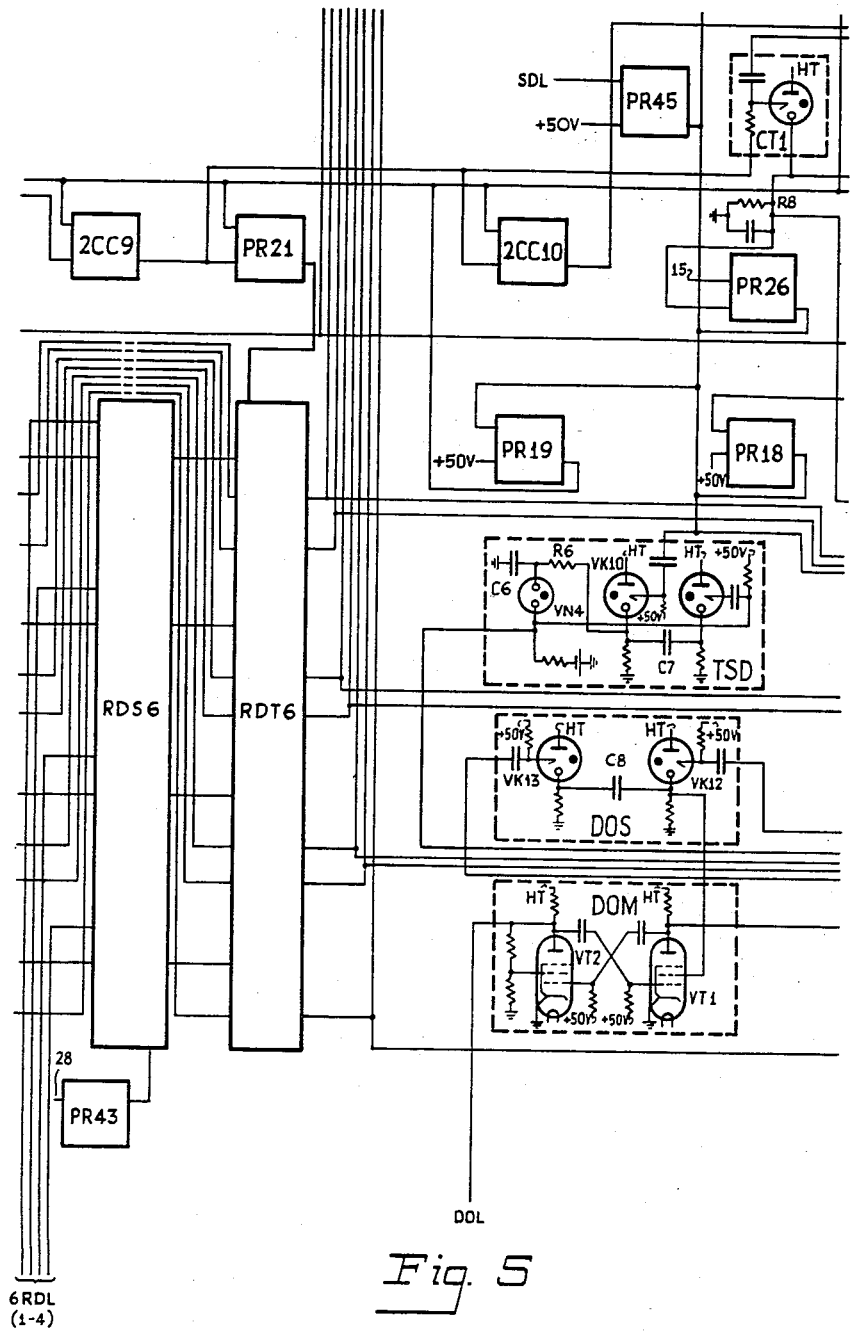
Figure 6:
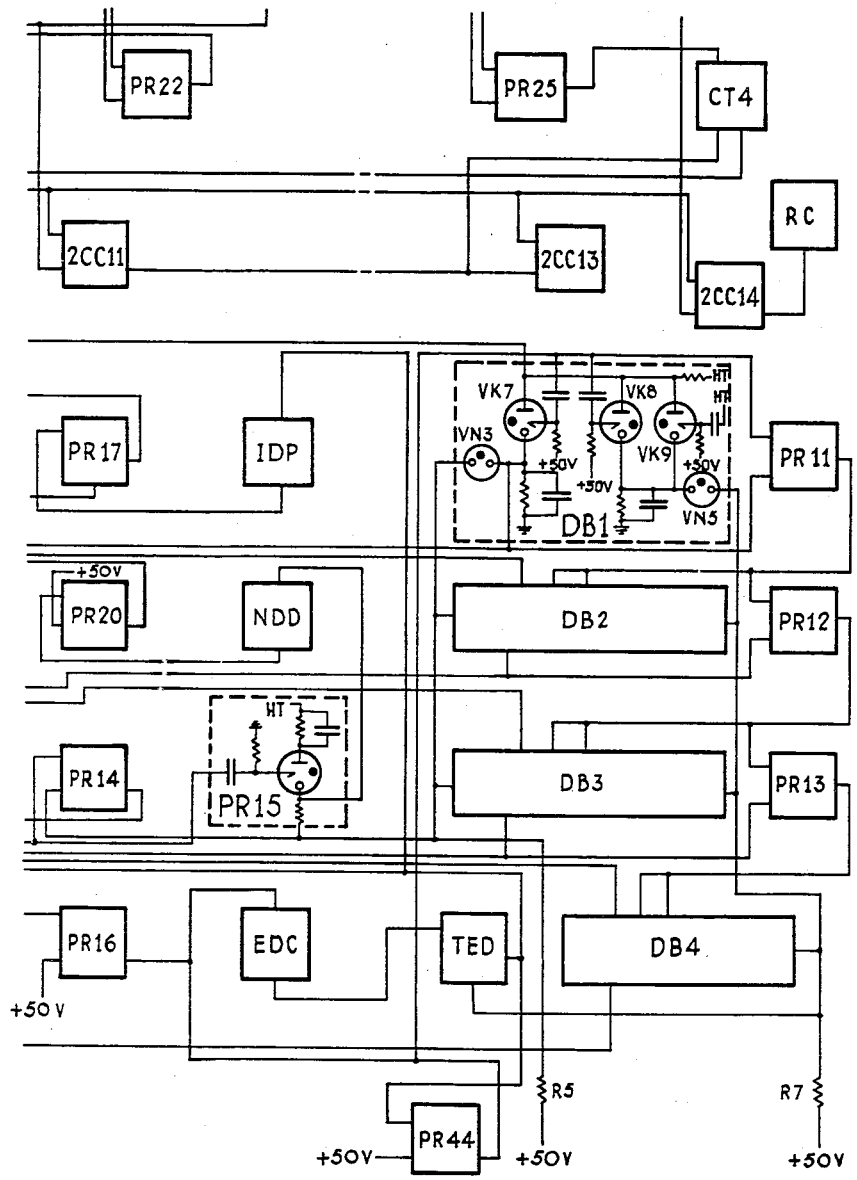

Inventor
RONALD THREADGOLD

June 19, 1956

R. THREADGOLD 2,751,435

REGISTERING AND TRANSLATING CIRCUITS FOR
USE IN TELECOMMUNICATION SYSTEMS

Filed June 23, 1953

12 Sheets-Sheet 2

Inventor
RONALD THREADGOLD.
By
Lippincott & Smith,
Attorneys

Inventor
RONALD THREADGOLD.

Inventor
RONALD THREADGOLD
By
Lippincott & Smith
Attorneys

Inventor
RONALD THREADGOLD

Inventor
RONALD THREADGOLD.

United States Patent Office 2,751,435
Patented June 19, 1956

2,751,435

REGISTERING AND TRANSLATING CIRCUITS FOR USE IN TELECOMMUNICATION SYSTEMS

Ronald Threadgold, Liverpool, England, assignor to Automatic Telephone & Electric Company Limited, Liverpool, England, a British company Application June 23, 1953, Serial No. 363,557

Claims priority, application Great Britain July 9, 1952

18 Claims. (Cl. 179—18)

The present invention relates to registering and translating circuits and is particularly concerned with circuits which respond to one or more trains of impulses and which retransmit certain of the trains in translated form. This type of automatic switching is used in telecommunication exchange systems and the invention has particular though not exclusive application to inter-exchange working in automatic telephone systems.

It is frequently required to route a telephone call through several exchanges to reach its destination and this normally involves the use of a large number of impulse trains. To avoid the necessity for the subscriber to dial or keysend a large number of routing digits it is usual to employ a register-translator at an exchange, whereby the exchange code and numerical digits dialled by the subscriber are stored while the exchange code is translated into a series of impulse trains indicative of the route to be taken to reach the required exchange, and these trains are subsequently transmitted followed by the numerical digits.

The object of the invention is to provide an improved register-translator which includes no electro-mechanical switching apparatus.

According to one feature of the invention in circuit arrangements adapted to store digits on groups of gas-filled discharge devices and to effect translation of the stored digits by electronic means into different digits a single translating circuit is provided in common to a plurality of registering circuits on which digits are capable of being stored and the translating circuit is arranged to test the registering circuits in turn until a registering circuit is found on which digits requiring translation are stored whereupon the translating circuit is associated exclusively with such registering circuit to enable the translating operation to take place.

According to another feature of the invention, in circuit arrangements adapted to store digits on groups of gas-filled discharge devices, to effect translation of the stored digits by electronic means into different digits and to transmit the translated digits a single translating circuit is provided in common to a plurality of register-senders and the translating circuit is arranged to test the register-senders in turn until a register-sender is found on which digits requiring translation are stored whereupon such register-sender is conditioned to transfer the stored digits to the translating circuit, which thereupon carries out the translating operation and the translated digits are transferred to said register-sender.

According to a further feature of the invention, in circuit arrangements comprising an electronic translating circuit adapted to be connected with any one of a plurality of electronic register-senders digits are transferred in binary form from the register-sender to the translating circuit where the digits are again converted into decimal form to enable their translation into different digits to be effected whereupon the translated digits are converted to binary form for transfer to the register-sender.

Figures 7, 13:
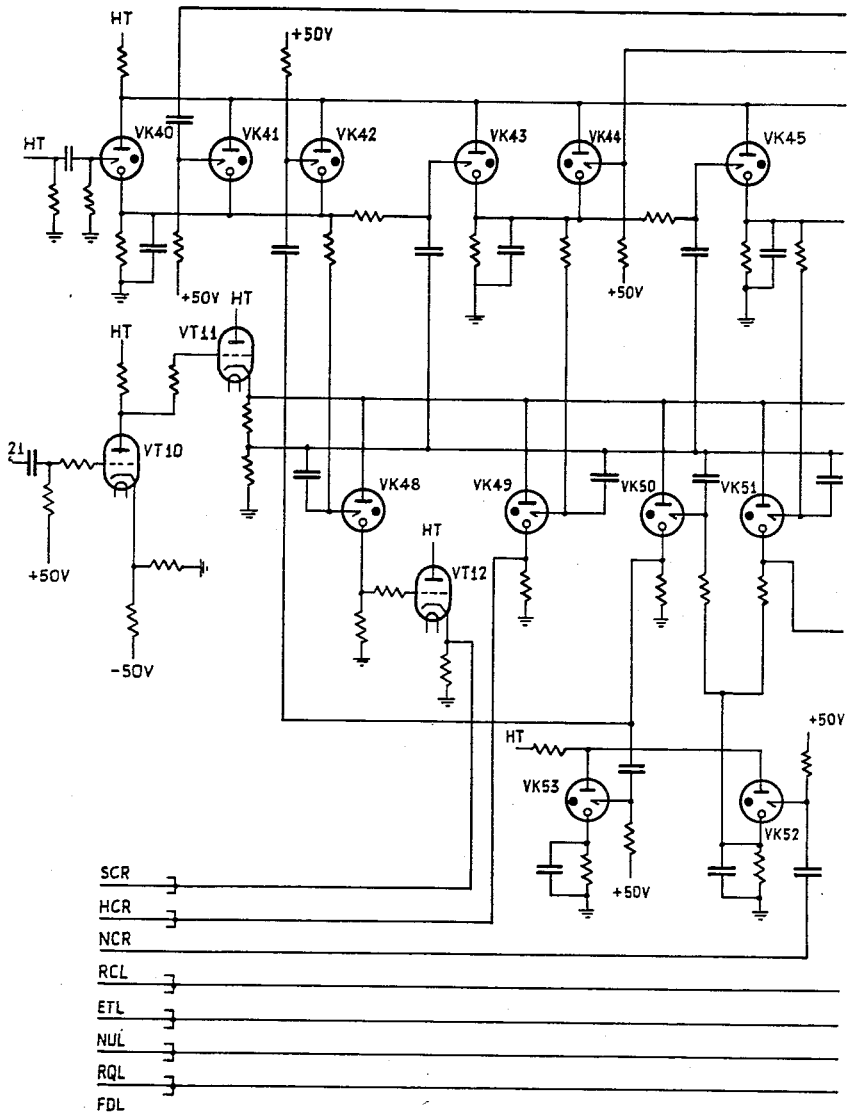
Figure 8:
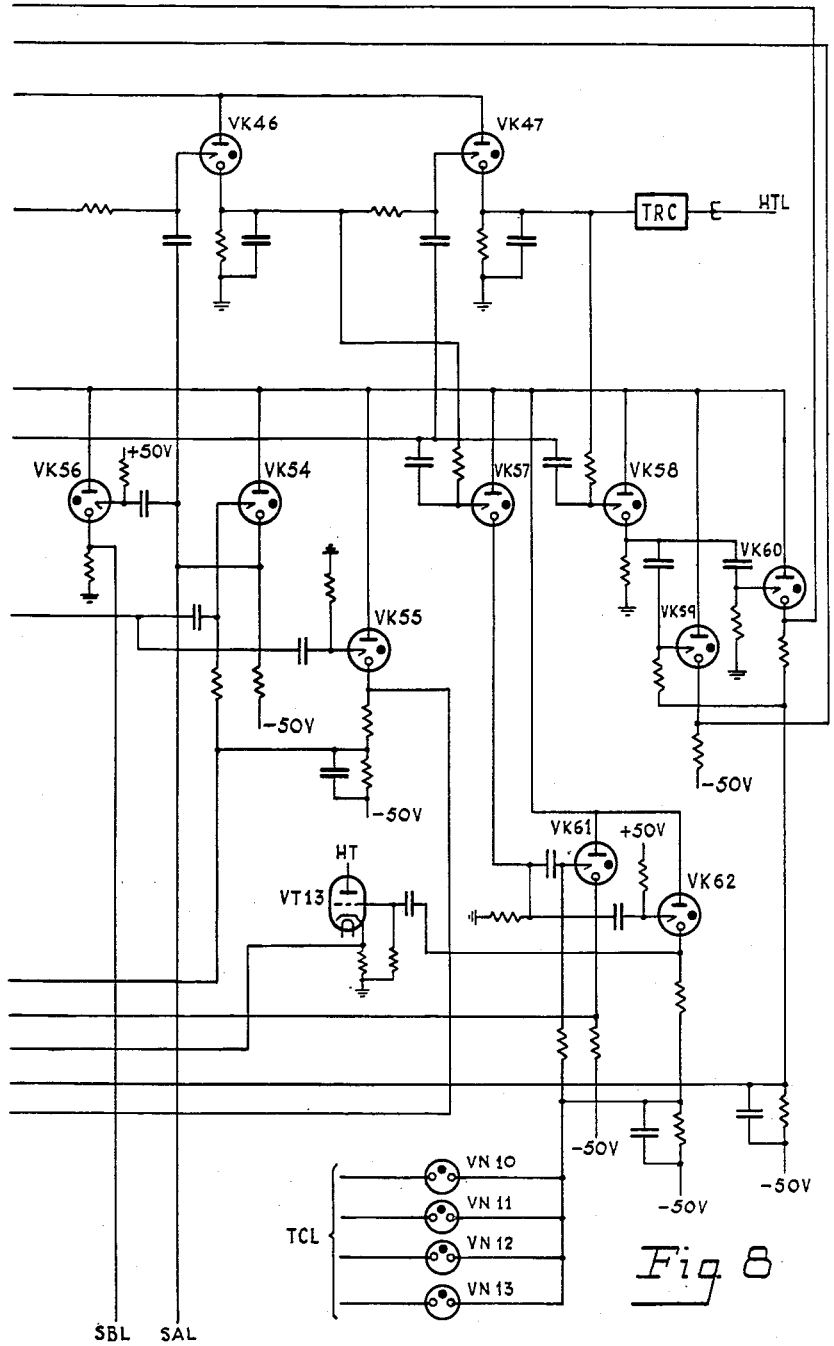
Figure 9:
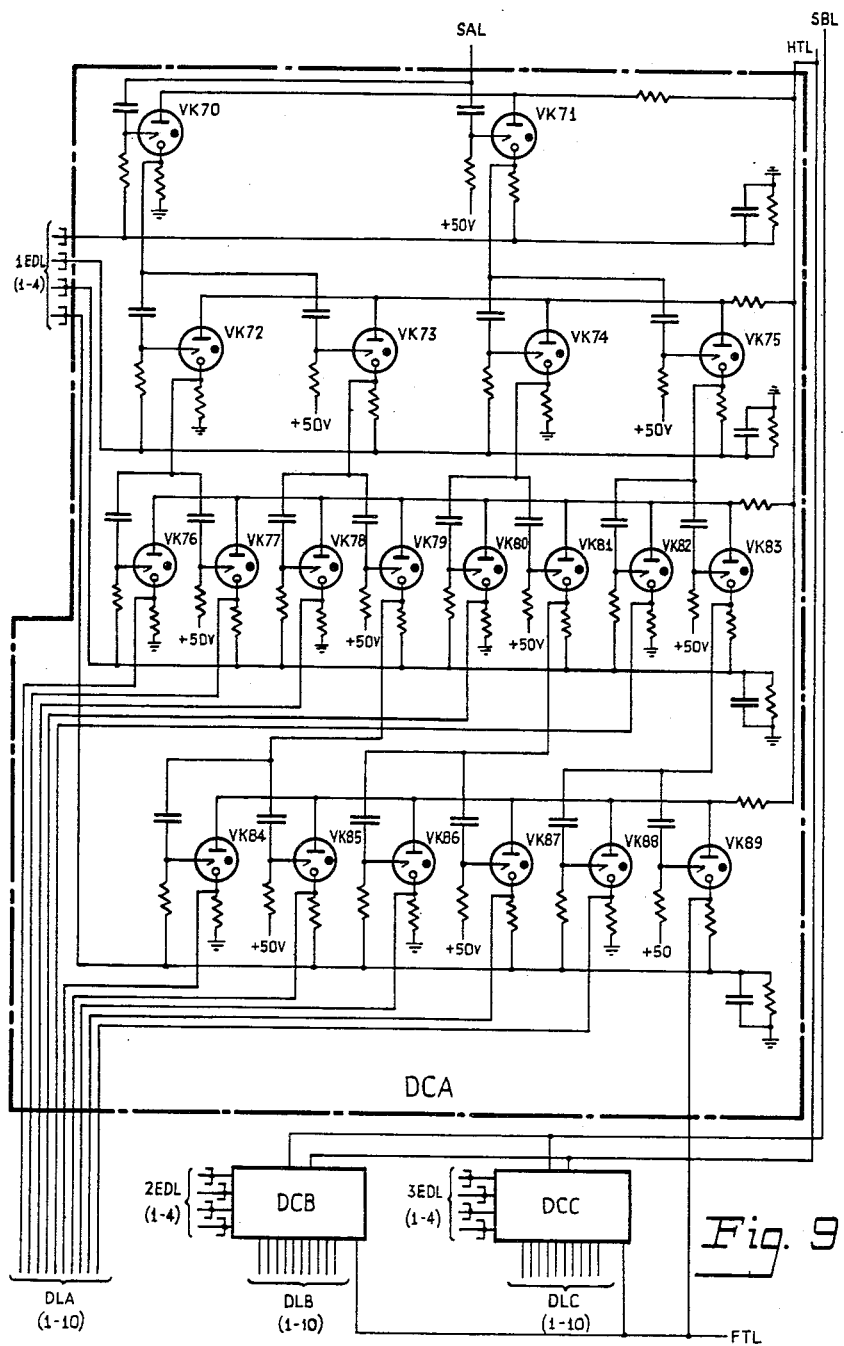
Figure 10:
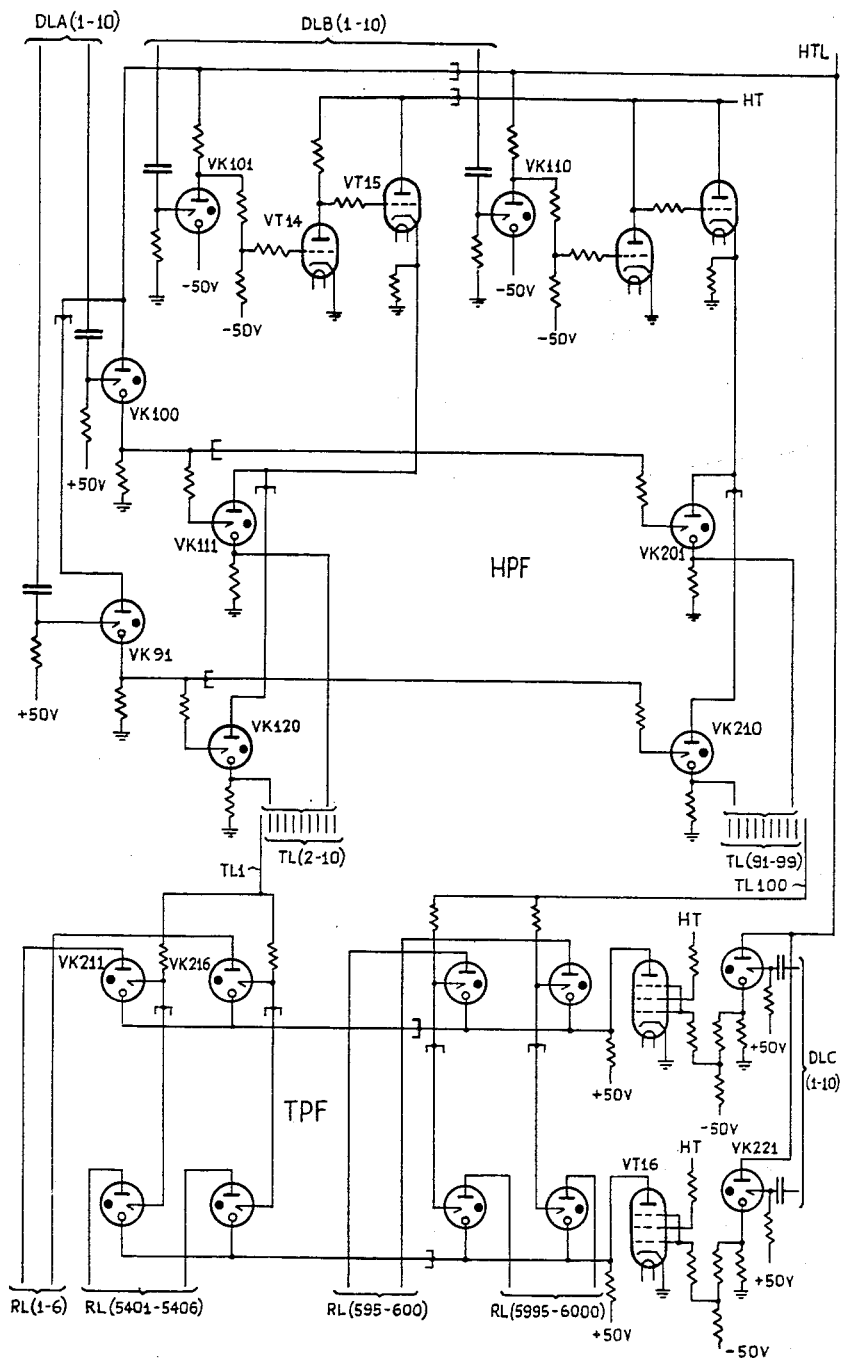
Figure 11:
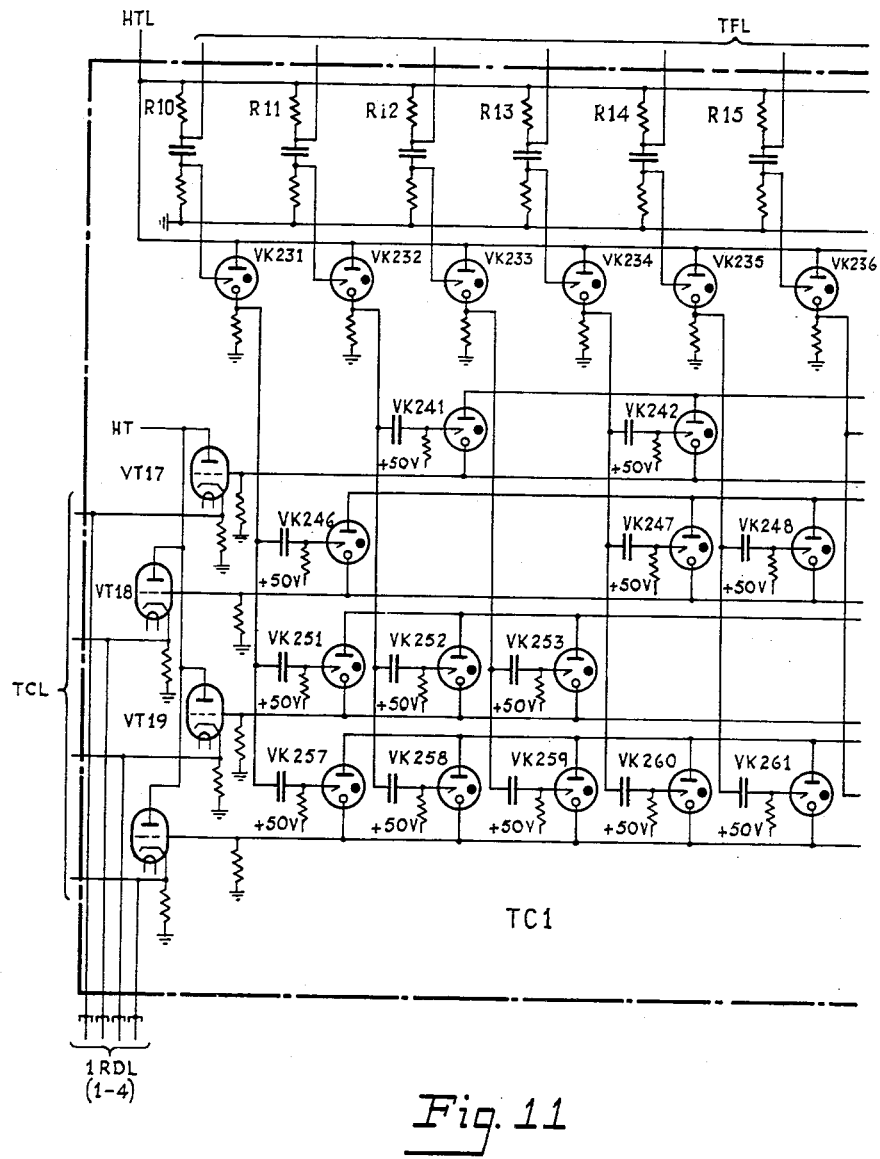
Figure 12:
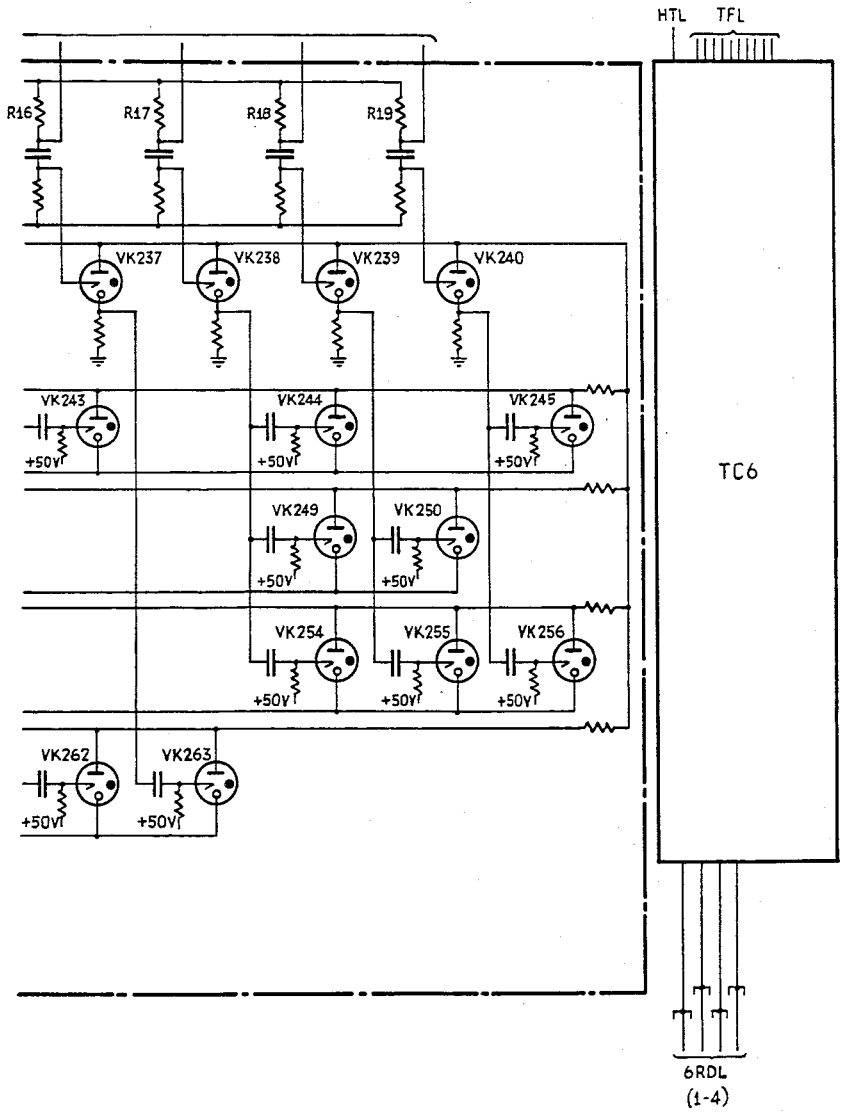

The invention will be better understood from the following description which is of an embodiment suitable for use in a typical telephone exchange system, and which should be read in conjunction with the accompanying drawings comprising Figs. 1 to 13 of which:

Figs. 1 to 6 show the circuit of a register, and should be arranged as shown in Fig. 13, Figs. 7 and 8 show the control circuit of a translator, Fig. 9 shows the binary/decimal conversion arrangements in the translator, Fig. 10 shows the arrangement for producing a six-point marking from the information supplied by a register, Figs. 11 and 12 show how the six-point marking is converted into six routing digits for display to the registers and Fig. 13 shows how to assemble Figs. 1 through 6.

The system employed uses decimal impulse trains combining three exchange code digits and four numerical digits and requires up to six routing digits from the translator to set up the call. The equipment is in three parts: a register of which there are several in the exchange, and whose function is to store information received from the subscriber's station and eventually to transmit it in a form suitable for setting up the desired connection; a translator of which there is only one in the exchange whose function it is to convert the stored information into a form suitable for setting up the desired connection, and a control circuit associated with the translator and arranged to connect registers requiring translation of their stored information momentarily to the translator while translation is effected.

Briefly the circuit operates as follows. The dialled information is received by the register and converted from decimal to binary form. When the full complement of exchange code digits has been received the register notes this and seizes the translator, and the code digits are transferred simultaneously from the register to the translator. There they undergo conversion to decimal form, and the translation is effected in this form. After conversion back to binary form the new routing digits are simultaneously transferred to the register and the translator is released. Transmission of the routing digits followed by the numerical digits is then carried out by a circuit which converts the stored information again into decimal form.

In the description, tubes designated VK are gas-filled tubes of the cold cathode type having three electrodes, those designated VN are gas-filled cold cathode diodes and those designated VT are thermionic tubes. It is assumed that the register includes a relay group, or its electronic equivalent, which provides so-called "A," "B" and "C" pulses. "A" pulses correspond to the impulses received from the subscriber's instrument and a "C" pulse is generated when the register is seized and after each train of "A" pulses. A "B" pulse is generated when the subscriber breaks the calling loop by replacing his handset.

Referring now to Figs. 1 to 6, which should be arranged as shown in Fig. 13, "A" pulses are applied to the trigger electrode of tube VK1 from lead 10 via capacitor C1, the tube being already primed by connection to 50 volts positive supply. Tube VK1 is provided with a resistor and capacitor in its anode circuit to enable it to function as a self-extinguishing pulse repeater providing a low impedance source of pulses from its cathode. Repeated pulses are applied to tubes VK2 and VK3 which together with tube VK4 have a common anode resistor R1 and it is arranged that only one of the tubes VK2 to VK4 can be conducting at one time. Tubes VK2 and VK3 will be referred to as a binary pair and tubes VK2 to VK4 comprise the binary counting circuit BC1.

When the register is first seized, a "C" pulse is applied over lead 11 to the trigger electrode of tube VK4 via capacitor C2. This tube is already primed by its connection to 50 volts positive and the tube fires on receipt of the pulse. Tubes VK2 and VK4 share a common cathode resistor R2, and when either tube is conducting the other tube is biased off by the rise in potential across the common cathode resistor. Tubes VK2 and VK3 are continuously primed by connection to the 50 volts positive supply and the first "A" pulse repeated by tube VK1 and applied to the trigger electrodes of this pair via capacitors C3 and C4 causes tube VK3 to fire, tube VK2 being biased off by the potential at its cathode. Tube VK4 is then extinguished due to the drop in potential at its anode.

The firing of tube VK3 causes a priming voltage from its cathode to be applied to the trigger electrode of tube VK5 over resistor R3. A second "A" pulse from tube VK1 applied to the trigger electrodes of tubes VK2, VK3 and VK5 via capacitors C3, C4 and C5, causes tube VK2 to fire, extinguishing tube VK3, and also fires tube VK5. Tube VK5 is connected as a pulse repeater, the tube and its associated circuit being designated PR1, and the tube is extinguished after delivering a pulse from its cathode to tubes in circuit BC2 and PR1.

The circuit BC2 is a binary counter similar in every respect to BC1 and comprises tubes corresponding to VK2, VK3 and VK4. The initial pulse at lead 11 fires the tube corresponding to tube VK4 thus ensuring that the first pulse received from the pulse repeater PR1 fires the right-hand tube of the binary pair, i. e. the tube corresponding to VK3. The firing of this tube in circuit BC2 primes the tube of the pulse repeating circuit PR2 in the same way as the firing of tube VK3 primed tube VK5. Circuit PR2 is similar in every respect to circuit PR1.

A third "A" pulse received by circuit BC1 will strike tube VK3 and extinguish tube VK2, again priming tube VK5. A fourth "A" pulse will again reverse the state of tubes VK2 and VK3, and tube VK5 will strike again to deliver a second pulse to circuits BC2 and PRL. This pulse will reverse the conditions of the tubes comprising the binary pair and will strike the pulse repeater PR2. A pulse will thereby be delivered to circuits BC3 and PR3 which are similar to their counterparts already described. Circuit BC4 is similar to circuits BC1 to BC3.

It will be seen from the foregoing that on receipt of successive "A" pulses tube VK2 and VK3 reverse their condition and when tube VK2 fires a pulse is repeated to the next circuit in the cascade connection. Similarly for pulses received by circuits BC2 and BC3, tubes corresponding to VK2 and VK3 fire in turn, the firing of the tube corresponding to VK2 initiating a pulse to the next circuit; for example, if the digit 7 were dialed, the 2d, 4th and 6th pulses would be effective in circuit BC2, and the 4th pulse would be effective in circuit BC3 in reversing the binary pair. Digit 9 would result in four pulses being delivered to circuit BC2, two pulses to BC3 and one pulse to BC4.

The state of the binary counting tubes in the four circuits BC1 to BC4 at the end of a digit is indicative of the digit which has been dialed. Since the auxiliary tube VK4 and corresponding tubes in other circuits is first struck to ensure that the first digital pulse received by a circuit fires the right-hand tube of its binary pair, the condition of either tube of the binary pair in each circuit can be used to indicate the dialed digit. It is convenient to take an indicating potential from the cathode of the left-hand tube, i. e. from resistors corresponding to R2 in circuit BC1, to mark the trigger electrodes of pulse repeating tubes PR4 to PR7.

At the end of the first digit, therefore, if tube VK2 or the corresponding tubes in circuit BC2 to BC4 are conducting, priming voltages will be applied to the trigger electrodes of the tubes in the corresponding pulse repeating circuits PR4 to PR7 and for tubes corresponding to VK2 which are not conducting, the corresponding pulse repeaters PR4 to PR7 will not be primed.

At the end of the first impulse train a "C" pulse will be generated and applied over lead 11 to the auxiliary tubes in circuits BC1 to BC4 to reset these circuits for the reception of the second digit. A "C" pulse will at the same time be applied to the trigger electrodes of tubes in pulse repeaters PR4 to PR7 from lead 12, and the repeaters which have been primed will fire and repeat the pulse from their cathodes. It will be apparent that the pulses delivered by pulse repeater PR4 to PR7 represent the complement to the digit 15 of the dialed digit translated into the binary system. For example, if digit 9 is dialed, at the end of the train the right-hand tube of the binary pair in circuits BC1 and BC4 will be conducting. Regarding the circuits BC1 to BC4 as the first four stages in the binary code, the firing of these two tubes would represent 1+8=9. At the end of the train, however, the "C" pulse would be repeated by circuit PR5 and PR6 only, which would be the second and third stages in a binary system in which the stages are circuits PR3 to PR6.

A counter circuit for incoming digits with a series of stages 1CC1 to 1CC7 of which only 1CC1, 1CC3, 1CC4 and 1CC7 are shown, receives "C" pulses over lead 13 and the tubes comprising the stages are arranged to conduct sequentially on the receipt of "C" pulses. As many stages are provided as there are digits in the exchange network numbering scheme, and provision is shown for a seven digit system, i. e. three exchange or code digits and four numerical digits. In addition, an end position is provided for the counter. It is arranged that the "C" pulse which occurs prior to the first train of "A" pulses fires the first stage 1CC1 of the counter, a suitable bias being provided at lead 14 at this time, and a priming voltage is taken from the cathode of this tube to the trigger electrodes of the tubes of the four storage circuits ST1 to ST4. The circuits ST2 are identical with circuit ST1.

Tubes VK6 to VK9 comprise the first exchange digit store EDS1, and the pulses which are repeated from the appropriate tube or tubes in the series PR4 to PR7 on receipt of the "C" pulse fire the corresponding tube or tubes in this store. Although the pulses are repeated to other storage circuits they have no effect therein because only the circuits of store EDS1 are primed from stage 1CC1 of the incoming digits counter. The firing of the appropriate tube or tubes in the store EDS1 primes the corresponding transfer tube or tubes in the series TT1 to TT4 comprising circuit EDT1. The "C" pulse following the first "A" pulse train is applied via lead 13 to the incoming digits counting circuit which steps to the next position 1CC2. Although the tube of stage 1CC1 is extinguished the cathode potential remains high for long enough to allow the tubes of the store EDS1 to strike from pulses applied by the pulse repeaters PR4 to PR7.

After the reception of the "C" pulse which follows the first exchange digit, "A" pulses corresponding to the second digit are then received by the binary counting chain as for the first digit, the final condition of the four binary pairs being indicative of the digit.

The "C" pulse following the second exchange digit performs the following functions:

(a) by application over lead 11, it resets the four binary counting circuits BC1 to BC4

(b) by application over lead 12, it fires the appropriate pulse repeating tube or tubes of the series PR4 to PR7, (c) by application over lead 13, it steps on the incoming digits counting circuit to position 1CC3.

The pulse or pulses repeated from tubes PR4 to PR7 are applied to all the digit storage circuits EDS1 to EDS3 and NDS1 to NDS4. These are identical with the store EDS1, and cater for the three exchange digits and four numerical digits respectively. Only the tubes in the store EDS2 (not shown) are primed because the incoming counter circuit has stepped to the second position. The pulse or pulses are therefore effective in firing the appropriate tube or tubes in the first store EDS2 only and this in turn primes the corresponding transfer tubes in circuit EDT2 (similar to circuit EDT1 but not shown). The condition of the tubes in circuits EDS1 and EDT1 is, however, maintained.

Subsequent trains of "A" pulses result in the appropriate tubes in the remaining exchange digit store EDS3 and numerical digit stores NDS1 to NDS4 being fired, and markings applied to the corresponding transfer tubes in circuits EDT3 and NDT1 to NDT4, which are identical with circuit EDT1, with the exception that the output leads of the four numerical digit transfer circuits NDT1 to NDT4 are connected in multiple. The reason for this will appear later in the description.

When the third stage of the incoming digits counter 1CC3 is reached after the second exchange digit has been received, a primary voltage is applied from the output lead of the stage 1CC3 to the first stage 2CC1 of an outgoing digit counting chain which comprises stages 2CC1 to 2CC14 and is similar to the incoming digits counter. The "C" pulse following the registering of the last exchange digit, applied over lead 14 causes tube 2CC1 to strike, priming the second stage 2CC2 of the chain. A recurrent pulse, derived from the translator and whose generation will be described subsequently, is extended to all registers over lead SCR, and the occurrence of this pulse in a register which is ready to have its stored exchange digits translated causes the outgoing digits counter to step to the second position, i. e. from stage 2CC1 to 2CC2.

The firing of the tube of stage 2CC2 by a pulse over lead SCR also results in biases being applied to stage 2CC3, to the transfer pulse repeater circuit PR8 and via the diode VN1 to the common lead RQL which indicates to the translator control circuit that a register is waiting to be connected to the translator. A short time after this pulse has been transmitted to all registers, the translator control circuit generates a hunting pulse which starts a high speed hunting chain. This chain consists of two tubes in each register, these being the tube VK6 and the tube of stage 2CC3 of the outgoing digits counter.

The hunting action is started by a pulse from the translator control circuit appearing on lead HP1L of the first register to be tested. The tube VK6 is permanently primed, and in a register not requiring translation, the tube will fire and repeat the pulse over lead HP2L to a corresponding tube in the next register to be tested. The tubes corresponding to VK6 will fire successively at high speed until one is reached which is biased off by the tube in the counter stage 2CC2 being fired, indicating that the register is waiting for translation. When such a register is reached by the hunting circuit, the hunting action stops and the pulse received from the previous register is able to fire stage 2CC3, which will be primed in a waiting register. Stage 2CC2 in firing strikes the diode VN2 and applies a voltage to the translator control circuit over lead RCL indicating that a register is awaiting translation.

A pulse from the high speed hunting chain also strikes the pulse repeated PR8 in the calling register, and a pulse is thereby repeated to all the tubes in the transfer circuits EDT1 to EDT3. The tubes in those circuits which are primed now fire and raise the potential of the appropriate leads of the groups of the corresponding leads 1EDL to 3EDL extending from their cathodes to the translator. Translation then takes place and the routing code, which may involve up to six digits in the case shown in the drawing, is returned to the calling register in binary form by means of pulses over the six sets of four leads 1RDL1 to 1RDL4 to 6RDL1 to 6RDL4. The end of translation is indicated by a pulse transmitted from the translator to all registers over lead ETL, which steps the outgoing digits counter to stage 2CC4.

A bias is, however, maintained for a short period by the cathode of the tube of stage 2CC3 to prime all tubes in the six routing digit storage circuits RDS1 to RDS6 while the pulses applied over the appropriate leads RDL fire the corresponding tubes in the storage circuits. The individual elements such as ST29 in the routing digit stores are identical with element ST1. It is convenient to arrange that the translator shall return the routing digits as the complement of their normal binary form, the effect being that the binary indication of routing digits in the six storage circuits is provided by those tubes which are not struck. The firing of certain tubes in the routing digit stores primes corresponding tubes in the routing digit transfer circuits, the elements TT29 and so on being identical with element TT1.

A pulse is now applied over lead SDL to repeater PR45 from the equipment controlling the setting up of the junction connecting circuit, indicating that a path has been completed to an outgoing junction and that impulses can now be transmitted. The pulse is repeated to the trigger electrode of the pulse repeater PR9 which has been primed from the counter stage 2CC4 and to a common lead to step the outgoing digits counter to position 2CC5 (not shown). The pulse from pulse repeater PR9 is applied to the tubes in the first routing digit transfer circuit RDT1 and the tube or tubes which have been marked from the storage circuit RDS1 fire, thereby transferring the stored digit to the "dialling-out" binary circuits DB1 to DB4. The effect of the firing of one or more tubes in circuit RDT1 is that in the appropriate circuits DB1 to DB4 a backing-off bias is applied to the cathode of the left-hand tube (e. g. VK14) of the binary pair (comprising tubes VK7 and VK8 in circuit DB1), and a priming voltage is applied to the associated pulse repeater of the three repeaters PR11 to PR13 where this is appropriate.

Circuits DB1 to DB4 are similar to the binary circuits BC1 to BC4, but their function is to translate stored routing and numerical digits from binary to decimal form. The three gas-filled triodes in each binary circuit, such as VK7 to VK9 in circuit DB1 have a common anode resistor, such as R4, which is also common to the corresponding transfer tube in all six routing digit transfer circuits, RDT1 to RDT6 and to the corresponding transfer tube in all four numerical digit transfer circuits NDT1 to NDT4. Before transfer of digits takes place, the four auxiliary tubes, such as VK9 in the circuits DB1 to DB4 are fired by the pulse applied to their trigger electrodes when the H. T. supply is switched on, and it is arranged that because of the common anode resistor, a transfer tube which fires in circuits RDT1 to RDT6 and NDT1 to NDT4 will extinguish the auxiliary tube in the corresponding circuit DB1 to DB4. Thus when the transfer of the first routing digit takes place, the condition of the four auxiliary tubes VK9 and so on, will be an indication of the digit in binary form. Since the digits are stored in the form of the complement in the six routing digit storage circuits, they will be restored for the dialling-out circuits, e. g. if the auxiliary tubes in circuits DB2 and DB3 are conducting, the digit to be transmitted is 6, if those in circuits DB1 and DB4 are conducting, the digit to be transmitted is 9 and so on.

When transfer takes place in the binary counter corresponding to a transfer tube which has fired the diode associated with the left-hand tube of the binary pair, such as VN3 in circuit DB1, will strike and a voltage will appear across the common resistor R5. The pulse which initiates transfer is also applied to the trigger electrode of tube VK10 in the stored digit test circuit TSD and fires this tube. The rise of potential at its cathode charges up capacitor C6 via resistor R6 in the anode of the high voltage diode VN4, which, after a delay, strikes. A pulse is applied therefrom to the trigger electrode of the tube VK11 which fires and applies a pulse via capacitor C7 to the cathode of tube VK10 which is thereby extinguished.

A pulse from the diode VN4 is applied also to the trigger electrodes of pulse repeaters PR14 and PR15 which are controlled from resistor R5. Pulse repeater PR14 is connected in the same manner as PR1, but PR15 has the bias lead connected to the cathode resistor as shown. When a digit is stored in the circuits DB1 to DB4, at least one diode such as VN3 will be fired, and the voltage across resistor R5 will prime the pulse repeater PR14 and back-off the pulse repeater PR15. Thus the tube which repeats the pulse received from the test circuit TSD is indicative of a digit having been transferred and being ready to be transmitted over the exchange junction. A description of the operation taking place if a digit has not been transferred, in which case pulse repeater PR15 fires, will be described later. If a digit has been transferred, repeater PR14 applies a pulse to the trigger electrode of tube VK12 of the dialling-out start circuit DOS, and this tube fires.

The firing of tube VK12 raises the potential of its cathode and of the screen of the thermionic tube VT1 to which it is connected and which is one of the pair VT1 and VT2 comprising the dialling-out multivibrator DOM. The multivibrator is arranged to make a complete cycle in 100 ms. if the dialling out speed is 10 i. p. s. or in a correspondingly shorter time if a higher dialling-out speed is required, pulses being applied over lead DOL to a circuit which generates impulses suitable for transmission to the exchange junction.

After each transmitted impulse, a pulse from the anode of tube VT1 is repeated by pulse repeater PR16 to the trigger electrodes of the binary pair of circuit DB1 and of the associated pulse repeater PR11. A pulse is also repeated via a delay circuit EDC, which is similar to circuit TSD, to a test circuit TED which is similar to PR15. The test circuit determines whether the digit stored in circuits DB1 to DB4 has been completely transmitted to line by causing the pulse repeater of circuit TED to be controlled through its cathode resistor by a voltage which is developed across resistor R7 when any of the diodes such as VN5 is conducting, which will occur when either tube VK15 or VK16 or a corresponding tube in the other three circuits conducting. While such a voltage exists, pulses from the multivibrator DOM are unable to fire the tube of circuit TED, but when all the diodes such as VN5 have been extinguished the bias is removed from the cathode of this tube and a pulse can be repeated from it which stops the multivibrator. It is the basis of the conversion from binary to decimal form to apply pulses to circuits DB1 to DB4 in turn and to their associated pulse repeaters PR11 to PR13 until the voltage is removed from across resistor R7.

The manner in which this transformation is achieved will best be understood by the consideration of an example. Consider the case where the first routing digit is "6." The tubes comprising the elements TT29 and TT32 of the transfer circuit RDT1 will fire when a pulse is applied from the repeater PR9 and potentials from the cathodes of these two tubes will bias off the left-hand tubes of the binary pairs in circuits DB1 and DB4 and will prime pulse repeater PR11. Initially all four auxiliary tubes VK9 and so on are fired, and on the transfer of the digit the auxiliary tubes in circuits DB1 and DB4 are extinguished, leaving those in circuits DB2 and DB3 conducting.

The result of the pulses applied to tubes VK7 and VK8 and to the repeater PR11 from the dialling-out multivibrator is as follows:

*1st pulse.*—tube VK8 strikes, extinguishing the tube of element TT29 and striking diode VN5 and the repeater PR11 strikes delivering a pulse to pulse repeater PR12 and to both tubes of the binary pair of circuit DB2. The left-hand tube of the pair strikes, extinguishing its auxiliary tube and priming pulse repeater PR12 which, however, does not fire because it is not primed before the termination of the pulse from repeater PR11. A voltage across resistor R7 is maintained from circuits DB1 and DB3.

*2d pulse.*—tube VK7 strikes, extinguishing tube VK8 and its associated diode VN3 and priming pulse repeater PR11. A voltage across resistor R7 is maintained from circuit DB3.

*3d pulse.*—tube VK8 strikes, extinguishing tube VK7 and striking diode VN5. Pulse repeater PR11 fires, delivering a pulse to pulse repeater PR12 and to both tubes of the binary pair in circuit DB2. The right-hand tube of this pair strikes, firing its associated diode and extinguishing the left-hand tube, and the pulse repeater PR12, which was primed on receipt of the first pulse, repeats a pulse to pulse repeater PR13 and to the binary pair of circuit DB3. The left-hand tube of this pair strikes, extinguishing the auxiliary tube and associated diode and priming pulse repeater PR13. A voltage across resistor R7 is maintained from circuits DB1 and DB2.

*4th pulse.*—tube VK7 strikes, extinguishing tube VK8 and its associated diode and priming pulse repeater PR11. A voltage across resistor R7 is maintained from circuit DB2.

*5th pulse.*—tube VK8 strikes, firing its associated diode and extinguishing tube VK7 and its associated diode. Pulse repeater PR11 delivers a pulse to pulse repeater PR12 and to the binary pair of circuit DB2. Of these the left-hand tube fires, extinguishing the right-hand tube and its associated diode. A voltage across resistor R7 is maintained from circuit DB1.

*6th pulse.*—tube VK7 strikes, extinguishing tube VK8 and diode VN5. This removes the backing-off voltage from resistor R7 and the cathode of the test pulse repeater TED.

After the multivibrator has delivered the 6th pulse to lead DOL, it delivers a pulse to the test pulse repeater TED via the pulse repeater PR16 and the time delay circuit EDC. The tube of circuit TED is not now backed off, and the pulse is therefore repeated to the tube VK13 of circuit DOS. Tube VK13 fires and applies a pulse via capacitor C8 to the cathode of tube VK12 which is thereby extinguished. The positive bias is removed from the screen of the thermionic tube VT1 and the multivibrator DOM stops oscillating. The firing of the tube of circuit TED applies a pulse to the repeater PR44, which repeats it to circuits DB1 to DB4 and resets these circuits by firing the right-hand tube of the binary pair in each case. The pulse repeated by circuit TED is also applied to the time delay circuit IDP which provides the interdigital pause required in dialling-out, and introduces the appropriate delay. This circuit is similar to circuit TSD.

The output pulse from time delay circuit IDP is fed to the pulse repeater PR17 which is similar to repeater PR15 and is controlled by a circuit which prevents the transmission of impulses to line from catching up with the registering of the subscriber's dialled impulses. After the appropriate delay, a pulse is repeated from circuit IDP via the pulse repeaters PR17 and PR18 to the circuit TSD and to pulse repeater PR19. The pulse repeated from repeater PR19 steps the outgoing digits counter from position 2CC5 to position 2CC6 and fires a pulse repeater associated with the counter stage 2CC5 in the same way as repeater PR9 is associated with stage 2CC4. This repeater thereupon applies a pulse to all tubes in the transfer circuit RDT2 (not shown). The marked tubes or tube in this circuit now fire and the digit is transferred to the binary counting circuits DB1 to DB4 as for the first routing digit.

After its delay period, circuit TSD delivers a pulse and tests for the presence of a digit in the circuits DB1 to DB4 as before. A pulse is then applied to the multivibrator start circuit DOS and impulsing proceeds as for the first digit. This is repeated for the remaining digits, the out-going counter moving on one step after each digit and priming the next transfer pulse repeater. The last stage concerned with routing digits is 2CC9 and the associated transfer pulse repeater is PR21.

In some cases the full complement of six routing digits may not be required, and there will then be no digit stored in the last one or more routing digit storage circuits. When the counter steps on to the stage corresponding to the first of the empty storage circuits, the next pulse from repeater PR19 will be unable to fire any of the transfer tubes and none of the diodes corresponding to VN3 in the dialling-out binary counting circuits will be fired. There will thus be no voltage developed across resistor R5, so that pulse repeater PR15 will not be backed off and pulse repeater PR14 will not be primed.

After its delay in circuit TSD, the pulse from repeater PR18 following the last digit transmitted will fire repeater PR15 which will deliver a pulse to circuit NDD. This is a delay circuit similar to circuit TSD, and after a short delay a pulse is delivered to pulse repeater PR20 which repeats the pulse to the testing circuit TSD, and to the counting chain and digit transfer pulse repeaters common lead via pulse repeater PR19.

Irrespective of the number of routing digits to be transmitted, on the transfer of the fifth routing digit to the binary chain DB1 to DB4, or after the delivery of a pulse from circuit NDD in the case where there are less than five routing digits, the outgoing digit counter steps to position 2CC9, priming stage 2CC10 and repeater PR21 and also the tube of circuit CT1. After the transmission of the fifth routing digit, pulse repeater PR18 delivers a pulse to each of the four pulse repeaters PR22 to PR25. These are arranged to be primed from the incoming digits counter stages 1CC4 to 1CC7 respectively, corresponding to the four numerical digits. Depending on the stage which the subscriber has reached in dialling, one of the tubes 1CC4 to 1CC7 will be conducting, and will prime the corresponding repeater in the series PR22 to PR25. This repeater will fire on receipt of the pulse from repeater PR18 and will deliver a pulse to the tube in the corresponding one of the four circuits CT1 to CT4, only the first and last of which are shown. If the subscriber has not dialled the first numerical digit when the last routing digit is being transferred for transmission, the tube of circuit CT1 will fire and raise the potential at resistor R8. This will back off pulse repeater PR17, so that the pulse applied to it after the transmission of the last routing digit is ineffective and the transfer of the first numerical digit is not initiated. This is to prevent the transmission to line from proceeding to a stage beyond which the subscriber has not completed dialling a digit.

When the first numerical digit has been stored, the succeeding "C" pulse will step on the incoming digits counter to the next stage, 1CC5, and will also fire the pulse repeater PR26 to which it is applied over lead 15. A pulse is thereby delivered by the outgoing circuit via repeater PR19 to step on the out-going digits counter to stage 2CC11 and to fire the transfer pulse repeater PR27, which was primed from stage 2CC10 and which repeats the pulse to circuit NDT1 to initiate the transfer of the first numerical digit to the impulse transmission binary chain.

Circuit CT1 remains conducting and the voltage developed across resistor R8 continues to back off pulse repeater PR17, so that the pulse which would normally be applied to it after the transmission of the first numerical digit is ineffective. There is therefore no attempt to transfer the second numerical digit until the arrival of the "C" pulse which follows its receipt by the resistor, and the transfer of the remaining numerical digits is also under the control of "C" pulses.

It is likely that the subscriber will have dialled one or more numerical digits by the time the register has completed transmission of the first five routing digits. Transmission to line will then proceed as previously described for the last routing digit and the stored numerical digits, pulse repeaters PR27 to PR30 being fired in turn as the outgoing digits counter steps on after each digit is transmitted. The pulse repeater in the series PR22 to PR25 corresponding to the digit which is being received by the register will strike each time a digit is being transferred for transmission, and when the outgoing digits counter reaches a position from which the latest stored digit is to be transferred, the appropriate tube in the series CT1 to CT4 fires and backs off the pulse repeater PR17 to transfer the control to the "C" pulses following the incoming digits.

After all the numerical digits have been dialled out, a pulse from circuit IDP is applied via repeaters PR17, PR18 and PR19 to fire the last stage of outgoing digits counter 2CC14 which is arranged to release the register by applying a pulse to the reset circuit RC which momentarily removes the HT supply from the appropriate circuits. In the event of the subscriber replacing his handset before dialling is completed, a "B" pulse from the relay group or its equivalent is applied via leads 16 to 22 to seven similar pulse repeaters PR31 to PR37, which have a common anode resistor with all the tubes in their associated exchange code and numerical digit storage circuits, and also via leads 23 to 28 to the six similar pulse repeaters PR38 to PR45 which have a common anode resistor with all the tubes in their associated routing digit storage circuits. The firing of these repeaters extinguishes all the digit storage tubes, and the outgoing digits counter is then driven to its end position by a pulse which passes cyclically through circuits TSD, PR15, NDD and PR20 and PR19, as was described for the case in which less than six routing digits are required. On reaching the end position of the outgoing digits counter the register is released.

Connection of the translator to a calling resistor is controlled by a cyclic counter of the type in which the firing of one tube extinguishes the one previously conducting. The counter comprises five stages and is shown as part of the translator control circuit in Figs. 7 and 8 which should be placed side by side with Fig. 7 on the left. The first stage consists of tubes VK40 to VK42 connected in parallel, the second stage tubes VK43 and VK44 connected in parallel, and the third, fourth and fifth stages comprise tubes VK45, VK46 and VK47 respectively. The counter is driven from a 400 C./S. a negative pulse source 21 via a thermionic amplifier VT10 and cathode follower V11.

Tube VK40 is fired when H. T. is first connected to the circuit and primes tubes VK43 and VK48. The first negative pulse at lead 21 results in a sudden rise in cathode potential of tube VT11 and this is applied in the form of a positive pulse to the trigger electrodes of tubes VK43 and VK48 which fire. Tube VK48 is one of a series of tubes controlled from the cathode of tube VT11 and arranged so that a tube which is primed will fire when the cathode potential of tube VT11 rises and will extinguish when tube VT10 again conducts. The firing of tube VK48 raises its cathode potential and a pulse is applied via the cathode follower VT12 over lead SCR to the second stage 2CC2 in the outgoing digits counter of all registers. In registers which have received a full complement of exchange digits, stage 2CC2 will fire and strike diode VN1, which applies a positive voltage to lead RQL and will also prime repeater PR8 and back off tube VK6 of the high speed hunting circuit as previously described.

When the second pulse from the 400 C./S. source is applied to the counter, tubes VK45 and VK49 will fire, both of these tubes being primed by the firing of tube VK43. Tube VK49 in firing applies a pulse over lead HCR which initiates the hunt for the calling register by firing the tube corresponding to tube VK6 in the first register over lead HP1L. Tube VK45 primes the next stage VK46 in the counter and also tube VK51. The high speed hunt is completed before the next 400 C./S. pulse, and if a calling register has been found its diode VN2 will strike to raise the potential of lead RCL, which primes tube VK54 and backs off tube VK55.

The next 400 C./S. pulse fires tube VK51 which thereupon applies a pulse to the trigger electrode of tube VK54 via a capacitor, and this tube strikes since it is primed from lead RCL. Its cathode is connected to the trigger electrodes of tubes VK46 and VK56 by capacitors and these tubes, the former of which is primed from tube VK45 fires after tube VK54. The firing of tubes VK54 and VK56 apply start pulses via lead SAL and SBL to the binary/decimal converter circuits DCA, DCB and DCC. Tubes VK47 and VK56 are primed by the firing of tube VK46 and the next 400 C./S. pulse fires both these tubes. Tube VK47 in firing primes tube VK58 and applies a pulse to the reset circuit TRC which momentarily removes H. T. voltage from those tubes in the translator supplied by lead HTL. Tube VK57 tests for the completion of the translation.

If the translation is complete one or more of the diodes VN10 to VN13, which are connected over leads designated TCL to the cathodes of the thermionic tubes of the first routing digit store in the translator, will fire and prime tube VK61 and back off tube VK62. Tube VK61 will fire on receipt of a pulse from tube VK57 and will give an indication of the end of translation to the calling register over lead ETL, to step on the outgoing digits counter to stage 2CC4, ready for transfer of the first routing digit to the transmission circuit. The next 400 C./S. pulse fires tube VK58 which tests for further registers awaiting translation. Registers which were set up on application of a pulse over lead SCR but were not reached by the high speed hunt will give an indication by their diodes VN1 being fired, and the potential on lead RQL will prime tube VK59 and back off tube VK60.

If no other registers have been set up by the first pulse over lead SCR, tube VK60 fires and strikes tube VK41 in the first stage of the counter, and the cycle proceeds as before. If a register is waiting, however, tube VK59 strikes and a pulse from its cathode strikes tube VK44 in the second stage of the counter. Tube VK48 is therefore not fired and no further registers are set up, but tube VK49 is primed and fires on receipt of the next 400 C./S. pulse to initiate the hunt for a calling register which was not reached by the previous hunt. This cycle is repeated until all calling registers set up on the first cycle have been cleared, when the counter is returned to its first stage to set up other registers awaiting translation.

In the event of there being no registers ready for translation, the hunting circuit runs through to its end position and applies a pulse to lead NCR to fire tube VK52. This is one of a bi-stable pair comprising tube VK52 and VK53, of which tube VK53 is normally conducting. If tube VK52 fires, tube VK51 is biased off and tube VK50 is primed, so that on the receipt of the 400 C./S. pulse which moves the counter to the third position, tube VK50 strikes instead of tube VK51. The firing of this tube resets the bi-stable pair to its normal condition and fires tube VK42 in the first stage of the counter. The transmission of the setting-up pulse over lead SCR and the initiation of the high speed hunt over lead HCR again takes place. Until a register calls therefore, the counter runs only to its third position and is returned to the first position on the receipt of the next 400 C./S. pulse.

If a fault condition arises such that no pulse appears on lead HCR to indicate that a register is calling, and no pulse appears on lead NCR to indicate that the high speed hunt has been completed without encountering a calling register, the firing of tube VK51 will fire tube VK55 which gives a fault indication from its cathode at lead FDL. This tube is normally backed off when a register is calling, but when a fault occurs there is no bias on lead RCL to prime tube VK54 or to back off tube VK55.

Translation takes place in the time interval between the firing of tubes VK46 and VK47 of the counter. If the subscriber has dialled an unused code, there will be no corresponding translation and no bias will have appeared on the trigger electrode of tube VK61 and the cathode of tube VK62 when tubes VK47 and VK57 fire on receipt of a 400 C./S. pulse. The firing of tube VK57 will therefore fire tube VK62, and a rise in voltage will be applied via the cathode follower VT13 to lead NUL which will fire the circuit NUC which is connected in parallel with stage 2CC4 of the outgoing digits counter in the calling register. This stage is arranged to give the subscriber an N. U. (number unobtainable) indication from the trunk relay set or equivalent.

Referring now to Fig. 9 receipt of code digits by the binary/decimal converter circuits DCA, DCB and DCC of the translator is by three groups of four leads indicated as 1EDL, 2EDL and 3EDL. The converting circuit for each digit is identical and comprises a diverging circuit arrangement of which the first circuit associated with the first lead, comprises two tubse, such as VK70 and VK71. The second circuit, associated with the second lead, comprises four tubes such as VK72 to VK75, two of which are controlled by one of the tubes of the first circuit while the remaining two are controlled by the second tube of the first circuit. Thus referring to the drawing, tubes VK72 and VK73 of the second circuit are controlled by tube VK70 of the first circuit while tubes VK74 and VK75 are similarly controlled by tube VK71. Eight tubes, such as VK76 to VK83 are similarly associated with the third lead and a theoretical sixteen tubes with the fourth lead, only six of which, such as VK84 to VK89 are required for the present conversion. A positive bias received over the first lead is arranged to prime tube VK70 and back off the normally primed tube VK71; a positive bias received over the second lead is arranged to prime one tube associated with each of the tubes of the first circuit and back off the other (which is normally primed), while a positive bias received over either of the other two leads in the same way is arranged to prime one of the two tubes associated with each of the tubes of the previous circuit and to back off the other.

Upon the display of digits by the register to the translator over leads 1EDL to 3EDL, the firing of tube VK54 applies a pulse over lead SAL to the trigger electrodes of both tubes (VK70 and VK71) associated with the first lead 1EDL1 in circuit DCA, and the firing of the tube VK56 applies a pulse over lead SBL to corresponding tubes in circuits DCB and DCC. If the first lead is marked the left-hand tube fires, if it is not the right-tube fires. Whichever of the tubes fires, it delivers a pulse to the associated two tubes in the next rank, and depending on whether or not the second lead is marked, so the left-hand or right-hand one of these two tubes fires. Similarly for the third rank, two tubes receive a pulse from the previous circuit, and either the left-hand or right-hand tube fires depending on whether or not the corresponding lead has received a marking from the register. In the event of tubes such as VK69, VK81 and VK83 firing, a pulse is applied to tubes in the fourth rank and the appropriate one fires.

The ten outlets from circuit DCA are taken from the cathodes of tubes VK76 to VK78, VK80, VK82 and VK84 to VK88, and the position of a pulse appearing in this set of ten outlet leads DLA in response to a pulse received over lead SAL is an indication of the exchange digit in decimal form. A further lead FTL is connected to the cathode of tube VK89 and is arranged to give a fault indication if no digit has been displayed on leads 1EDL1 to 1EDL4. Similarly for the second and third digits, a marking will appear on one of the ten outlet leads DLB1 to DLB10 and on one of the ten leads DLC1 to DLC10. The three digits for translation will now be represented by markings on three of thirty leads.

Referring now to Fig. 10, the first and second digits are used to mark a single intersection in a 100-point field HPF. The ten outlets DLA from the first digit receiving circuit are connected respectively to the trigger electrodes of ten tubes VK91 to VK100, and the appropriate tube fires when the binary to decimal conversion is complete. The ten outlets from the second digit receiving circuit are connected respectively to the trigger electrodes of ten tubes VK101 to VK110, one of which fires on completion of conversion of the second digit. The firing of such a tube biases off an associated thermionic tube, e. g. VT14 which is normally conducting. The rise in potential at the anode of this tube causes the thermionic tube VT15 to conduct and the increase of potential at the cathode of this tube raises the anode potential of the ten tubes VK111 to VK120 associated with it. In a similar manner, the ten tubes VK201 to VK210 would have their anode potentials raised if a marking head appeared on lead DLB10. The trigger electrode of one tube in each vertical column will have been raised in potential by the firing of a tube in the series VK91 to VK100 and these ten tubes will be conducting across the minor gap. Such a tube in a column in which the common anode potential is raised will now fire across the main gap, and one tube in the field HPF will therefore conduct as a result of the first and second digit markings.

The main translation field TPF consists of 1000 intersections, each intersection comprising six tubes such as VK211 to VK216 corresponding to the six routing digits into which the three code digits are to be converted. The 100 abscissae are associated with the 100 leads TL1 to TL100, from the 100 point field, to each of which the trigger electrodes of ten groups of six tubes are connected. The ten ordinates are associated with the ten outlets DLC1 to DLC10 of the third code digit binary/decimal converting circuit.

Leads DLC1 to DLC10 are connected to ten tubes VK221 to VK230. The appropriate tube in firing causes the associated thermionic tube, e. g. VT16, to conduct and the fall in potential at the anode of the latter is applied to the cathodes of the six tubes in each of 100 groups of the appropriate abscissa. One group of six tubes will have both its cathode potentials reduced and its trigger electrode potentials raised sufficiently for the six tubes to strike.

The 6000 leads RL from the anodes of tubes in the 1000-point field are taken via leads TFL to resistors connected in six groups of ten, representing the six routing digits in decimal form. One group of these resistors is shown in Figs. 11 and 12, which should be placed side-by-side with Fig. 11 on the left, as R10 to R19. The 6000 leads are so distributed that each lead in a group of six connects with a resistor in a different group of ten. When the six tubes of one intersection strike the potential difference developed across one of the ten resistors in each of the six groups provides a decimal indication of the six routing digits resulting from the translation, and the translation is readily varied by altering the connections from an intersection point.

It is now required to convert the decimal indication into binary form for transfer to the register and the display is given by voltages developed on six groups of four leads RDL, of which 1RDL (1-4) are shown in Fig. 11. Since the register is arranged to receive the six routing digits in complementary form, the binary indication will in reality be given by those leads which remain at earth potential.

The firing of a tube in the 1000-point field produces a voltage drop across one of the resistors R10 to 919, and a negative pulse is applied via the associated capacitor to the corresponding tube in the rank VK231 to VK210 and this tube strikes. According to which tube in this rank strikes, a positive pulse is applied to the trigger electrode of a tube in one or more of the other four ranks of tubes, VK241 to VK245, V246 to VK250, VK251 to VK256 and VK257 to VK263 to strike this tube or tubes. The rise in potential at the cathode resistor common to a rank of tubes in which one has fired causes the associated cathode follower (VK17 to VT20) to conduct, and a positive bias will appear on the appropriate lead or leads RDL. For example, if the first routing digit resulting from the translation is six, tube VK236 would fire, and pulses would be applied to tubes VK243 and VK262. These tubes would fire and cause tubes VT17 and VT20 to conduct. Leads 1RDL1 and 1RDL4 would have their potential increased and this complementary binary indication would be displayed to the registers.

In addition the potential rise would fire one of the diodes VN10 to VN13 by way of a lead TCL, to indicate that the translation had been completed. Decimal/binary conversion is performed for the other five routing digits simultaneously in circuits TC2 to TC6 and all digits are simultaneously displayed to the registers.

The translator is reset each time tube VK47 fires and the removal of H. T. from lead HTL extinguishes the exchange digit transfer tubes in the register.

We claim

1. In a switching system, a control circuit, a plurality of controlled circuits, a plurality of serially-connected two-position switching devices, one of said devices being associated with each of said controlled circuits, means in said control circuit for transmitting a signal to each of said controlled circuits, means in each of said controlled circuits for responding to said transmitting signal and for applying a conditioning potential to the associated two-position switching device in the event that the controlled circuit requires to be operatively connected to said control circuit, means in said control circuit for applying a pulse to the first of said serially-connected two-position switching devices, means in each of said serially-connected two-position switching devices responsive to a pulse applied thereto for operatively connecting the associated controlled circuit to said control circuit in the event that the two-position switching device has a conditioning potential applied thereto from the associated controlled circuit, and means in each of said serially-connected two-position switching devices responsive to a pulse applied thereto in the absence of a conditioning potential for repeating the pulse to the next two-position switching device in the series.

2. A switching system as claimed in claim 1 wherein said two-position switching devices each comprise first and second gaseous discharge tubes and a permanent biasing potential is applied to the second gaseous discharge tube while the conditioning potential is applied as a biasing potential to the first gaseous discharge tube and a backing-off potential to the second gaseous discharge tube.

3. A switching system as claimed in claim 2 wherein the input to a two-position switching devise is connected in parallel to the first and second tubes of the device while the output of the second tube of the device is connected to the input of the two-position switching device next in series therewith.

4. A switching system as claimed in claim 3 wherein each controlled circuit includes a sequence device comprising a plurality of stages of gaseous discharge tubes, the first gaseous discharge tube of the associated two-position switching device forming one of said stages.

5. A switching system as claimed in claim 4 and including means connecting said signalling means in the control circuit to a stage of the sequence switching devices in all said controlled circuits just prior to said one stage whereby the application of said signal simultaneously to all the controlled circuits causes the operation of the said prior stages in the controlled circuits which require connection to the control circuit.

6. A switching system as claimed in claim 5 and including means connecting the output of each prior stage to the trigger electrode of said first gaseous discharge tube of the two-position switching device forming said one stage and to the cathode of said second gaseous discharge tube of said two-position switching device and means for applying said pulse to the trigger electrodes of said first and second tubes.

7. In a switching system, a control circuit, a plurality of controlled circuits, a sequence switching device in said control circuit having a plurality of stages, a source of pulses in said control circuit, means for applying pulses from said pulse source to said sequence switching device to cause the successive operation of the stages thereof, means effective on the operation of the second stage of said sequence switching device for transmitting a first signal simultaneously to each of said controlled circuits, means in said controlled circuits for responding to said first signal and in the event that at least one of said controlled circuits requires to be operatively connected with said control circuit for returning a potential from each of such controlled circuits to said control circuit, means effective on the operation of the third stage of said sequence switching device for operatively associating one of said controlled circuits with said control circuit and for disconnecting said potential at said one controlled circuit, means in said sequence switching device effective during the operation of the third to last stages thereof for controlling the operation od said one controlled circuit and means responsive jointly to the operation of said last stage and the continuance of said returned potential for again operating said third stage operatively to connect another of said controlled circuits with said control circuit.

8. A switching system as claimed in claim 7 and including means responsive to the operation of said last stage in the absence of said potential for operating said first stage.

9. A switching system as claimed in claim 7 wherein means are provided whereby if none of said controlled circuits require to be operatively associated with said control circuit, a second signal is returned from one of said controlled circuits to said control circuit while means in said control circuit respond to said second signal to cause the operation of said first stage next after the operation of said third stage.

10. In a switching system a control circuit, a plurality of controlled circuits, a sequence switching device in said control circuit having a plurality of stages, means for operating said stages in sequence, means responsive to the operation of one stage for simultaneously testing said controlled circuits to determine whether any of said controlled circuits require to be operatively connected with said control circuit, a first lead in said control circuit and a second lead in each of said controlled circuits, the second leads being connected in parallel with said first lead, means in said controlled circuits responsive to said simultaneous testing for applying a potential to the second leads if the associated controlled circuits require connection to said control circuit, a high speed hunting circuit, means responsive to the operation of another stage of said sequence switching device for initiating the operation of said hunting circuit, means in each of said controlled circuits responsive to said hunting circuit finding one of said controlled circuits which requires operative connection with said control circuit for effecting such operative connection and for removing the potential from the associated second lead, means in said sequence switching device effective during the operation of said device from said other to a further stage for controlling the operation of said one controlled circuit, means responsive to the operation of said further stage in the absence of potential on said first lead for again operating said one stage, means responsive to the operation of said further stage in the presence of potential on said first lead for again operating said other stage and means effective if said hunting circuit finds no controlled circuit requiring operative connection with said control circuit for again operating said first stage.

11. In a switching system, a control circuit, a plurality of controlled circuits, a sequence switching device in said control circuit having a plurality of stages, means for operating said stages in sequence, means responsive to the operation of the second stages of said sequence switching device for transmitting a signal simultaneously to each of said controlled circuits, means in said controlled circuits for responding to said signal and in the event that at least one of said controlled circuits requires to be operatively connected to said control circuit for returning a potential from each of such controlled circuits to a lead in said control circuit, a high-speed hunting circuit, means responsive on the operation of the third stage of the sequence switching device for initiating the operation of said hunting circuit, means in each of said controlled circuits responsive to said hunting circuit finding one of said controlled circuits which requires to be operatively connected to said control circuit for effecting such operative connection and for removing the potential applied by said one controlled circuit to said lead, means in said sequence switching device effective during the operation of the fourth to last stages for controlling the operation of said one controlled circuit, means in said hunting circuit effective if none of said controlled circuits require connection to said control circuit for transmitting a signal to said control circuit and means responsive to the transmission of said signal for causing the operation of the first stage of the sequence switching device next following the operation of said third stage.

12. In a telephone system, a register translating arrangement comprising a plurality of registers, a translator, means for associating said translator with any one of said registers, storage circuits in each of said registers for storing on a binary basis digits transmitted thereto on a decimal basis, means for transferring said digits from said one register to said translator, means in said translator for converting each digit from binary to decimal form, means in said translator for translating the digits in decimal form into another set of digits also in decimal form, means in the translator for converting each translated digit in decimal form to a digit in binary form, means for transferring the translated digits in binary form from said translator to said one register, further storage means in said one register for storing said translated digits in binary form and means for dissociating said translator from said one register.

13. A register-translating arrangement as claimed in claim 12 wherein said translator comprises a first set of gaseous discharge tubes arranged in rows and columns, a second set of gaseous discharge tubes also arranged in rows and columns, a first group of leads extending from said binary to decimal converting means for one digit to the trigger electrodes of rows of gaseous discharge tubes in said first set of gaseous discharge tubes whereby a striking voltage is applied from one of said first group of leads to the minor gap of the gaseous discharge tubes forming one row, a second group of leads extending from said binary to decimal converting means for a second digit to the anodes of gaseous discharge tubes forming columns in said first set of gaseous discharge tubes whereby a voltage is applied from one of said second group of leads to the major gap of the gaseous discharge tubes forming one column of gaseous discharge tubes, a third group of leads extending from the cathodes of the gaseous discharge tubes forming said first set to the trigger electrodes of groups of tubes forming the rows of said second set of tubes whereby a striking voltage is applied from one of said third group of leads to the minor gap of one row of gaseous discharge tubes the number of gaseous discharge tubes in a group being equal to the maximum possible number of translated digits and a fourth group of leads extending from said binary to decimal converting means for a third digit to the anodes of groups of gaseous discharge tubes forming the columns of said second set of tubes whereby a voltage is applied from one of said fourth group of leads to the major gap of groups of gaseous discharge tubes forming one column of said second set, one group of gaseous discharge tubes of said second set of tubes being struck in response to the reception of said first, second and third digits in said translator 14. A register-translating arrangement as claimed in claim 13 and including a plurality of groups of ten leads, the number of groups being equal to the maximum possible number of translated digits, cross connections between the cathodes of said groups of tubes forming the second set to the appropriate ones of said plurality of groups of ten leads and connections from said plurality of groups of leads to said decimal to binary converting means.

15. A register-translating arrangement as claimed in claim 12 wherein said translated digits are transferred to said one register as complements to a predetermined number and means are provided for applying said digits in turn to a counting device comprising a multi-stage binary counting circuit which controls the transmission of the translated digits in decimal form.

16. A register-translating arrangement as claimed in claim 15 and including means for injecting each translated digit successively into said counting circuit, a pulse source, an output circuit, means connecting said pulse source to said counting circuit and said output circuit, means responsive to the injection of a translated digit into said counting circuit for rendering said pulse source effective to transmit pulses to said counting circuit and said output circuit and means responsive to the counting out of said counting circuit for rendering said pulse source ineffective thereby terminating the transmission of pulses to said counting circuit and said output circuit.

17. A register-translating arrangement as claimed in claim 16 and including test means effective on the termination of the transmission of a translated digit for testing for the presence of another digit in said counting circuit and for maintaining said pulse source ineffective in the absence of said other digit.

18. A register-translating arrangement as claimed in claim 12 wherein said means for transferring digits from said translator to one of said registers comprise a plurality of groups of leads, one group for each digit extending between said translator and said registers, means connecting said leads in said translator to the cathodes of a plurality of first discharge tubes whereby the conduction of one of said first discharge tubes applies a potential to the associated one of said leads, means connecting said leads in each of said register to the trigger electrodes of a plurality of second discharge tubes whereby the application of a potential to one of said leads causes a pulse voltage to be applied to the associated one of said second gaseous discharge tubes in all the registers and means in each of said registers for applying a priming potential to all the second discharge tubes in that register.

References Cited in the file of this patent
UNITED STATES PATENTS

| | | |
|---|---|---|
| 2,623,108 | Holden | Dec. 23, 1952 |
| 2,633,498 | Schneckloth | Mar. 31, 1953 |
| 2,638,506 | Bray et al. | May 12, 1953 |
| 2,666,096 | Cornell et al. | Jan. 12, 1954 |